(12) United States Patent
Kuwata

(10) Patent No.: US 9,310,936 B2
(45) Date of Patent: Apr. 12, 2016

(54) INPUT DEVICE AND ELECTRONIC INFORMATION BOARD SYSTEM

(71) Applicant: Masahiro Kuwata, Tokyo (JP)

(72) Inventor: Masahiro Kuwata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/283,541

(22) Filed: May 21, 2014

(65) Prior Publication Data

US 2014/0354600 A1    Dec. 4, 2014

(30) Foreign Application Priority Data

May 29, 2013    (JP) ................. 2013-112890

(51) Int. Cl.
  *G06F 3/042*    (2006.01)
  *G06F 3/0354*    (2013.01)

(52) U.S. Cl.
  CPC .......... *G06F 3/0421* (2013.01); *G06F 3/03545* (2013.01); *H04N 2201/0438* (2013.01)

(58) Field of Classification Search
  CPC ..... G06F 3/0421; G06F 3/042; G06F 3/0416; G06F 3/0428; G06F 2203/04109; G06F 3/017; G06F 3/0425
  See application file for complete search history.

(56) References Cited

U.S. PATENT DOCUMENTS

| | | | | |
|---|---|---|---|---|
| 4,697,050 A | * | 9/1987 | Farel et al. | 178/19.07 |
| 5,475,401 A | * | 12/1995 | Verrier et al. | 345/179 |
| 6,100,538 A | * | 8/2000 | Ogawa | 250/559.29 |
| 2012/0263381 A1 | * | 10/2012 | Yoshida | 382/189 |
| 2013/0135346 A1 | | 5/2013 | Sakuramata et al. | |

FOREIGN PATENT DOCUMENTS

| | | | | |
|---|---|---|---|---|
| JP | 5-203820 | * | 1/1992 | G02B 6/04 |
| JP | 2005-078433 | | 3/2005 | |
| JP | 2013-131204 | | 7/2013 | |

OTHER PUBLICATIONS

U.S. Appl. No. 14/170,767, filed Feb. 3, 2014.

* cited by examiner

*Primary Examiner* — Olga Merkoulova
(74) *Attorney, Agent, or Firm* — Oblon, McClelland, Maier & Neustadt, L.L.P.

(57) ABSTRACT

An input device for inputting coordinates to a coordinate detector includes an operation detector to detect whether a coordinate input operation to the coordinate detector is conducted; a signal generation unit to generate an operation-in-progress signal indicating an operation is in progress when the operation detector detects the coordinate input operation; a signal outputting unit to output the operation-in-progress signal generated by the signal generation unit; and a light guide member to guide the operation-in-progress signal output by the signal outputting unit to an exit position.

9 Claims, 10 Drawing Sheets

A-A CROSS-SECTION
B-B CROSS-SECTION

FIG. 11A
RELATED ART
FIG. 11B
RELATED ART
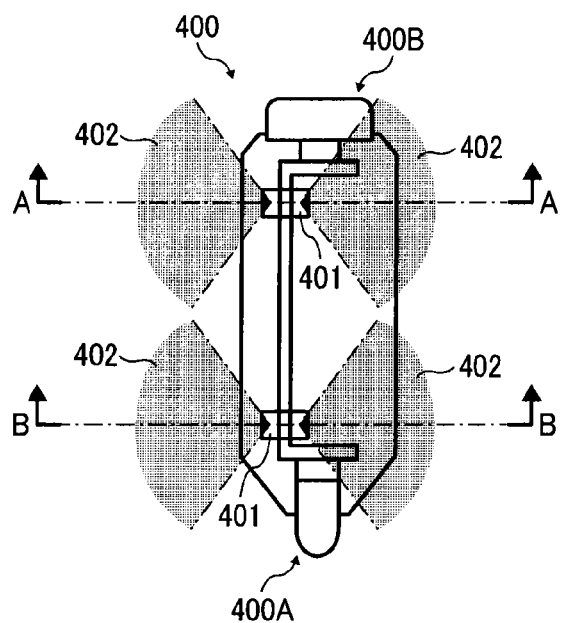
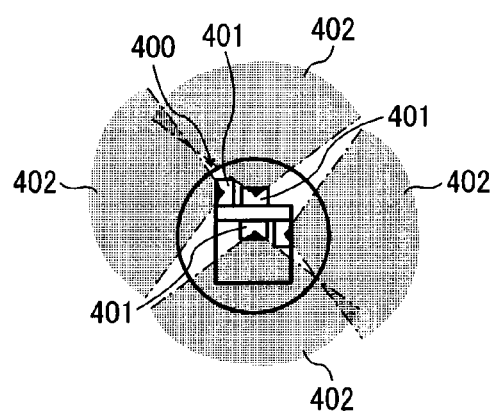
A-A CROSS-SECTION
B-B CROSS-SECTION

INPUT DEVICE AND ELECTRONIC INFORMATION BOARD SYSTEM

CROSS-REFERENCE TO RELATED APPLICATION

This application claims priority pursuant to 35 U.S.C. §119 to Japanese Patent Application No. 2013-112890, filed on May 29, 2013 in the Japan Patent Office, the disclosure of which is incorporated by reference herein in its entirety.

BACKGROUND

1. Technical Field

The present invention relates to an input device and an electronic information board system employing the input device.

2. Background Art

The development of electronic information boards such as electronic blackboards and interactive whiteboards (IWB) has been progressing. The electronic information board includes, for example, an image display apparatus, a coordinate detector and a control apparatus. The image display apparatus employs a relatively large screen using a flat panel such as a liquid crystal panel and a plasma panel having a diagonal size of 40 to 60 inches. The coordinate detector (e.g., touch panel) detects coordinates of positions where a pen-like input device contacts on a display face of the image display apparatus. The control apparatus displays various images such as characters, numbers and figures based on coordinates data output from the coordinate detector, written on the display face of the image display apparatus using the pen-like input device.

Further, by connecting the electronic information board to a personal computer (PC), an image displayed on a display of the PC can be enlarged and displayed on the electronic information board, which may be used for presentation on meetings.

When the input operation of the pen-like input device is conducted to the electronic information board, operation-in-progress signals indicating the input operation is being conducted should be sent to the electronic information board. If a finger or a hand of an operator or other person touches the touch panel of the electronic information board, unintentional writing and erasing may occur. Further, if the pen-like input device has a plurality of functions such as writing and erasing (eraser), signal should be sent to the electronic information board which function is conducted.

Conventionally, the pen-like input device has a writing unit, and a pen end made of an elastic member such as rubber. When the pen end is moved on the touch panel while being contacted, the writing unit detects a writing operation and outputs a writing-operation-in-progress signal to the electronic information board such as a touch panel. The movement of the pen end on the display face while being contacted on the display face of the electronic information board can be detected by an optical sensor such as the touch panel as coordinates of contacting positions, with which characters and figures can be written similar to usual handwritten blackboards and whiteboards.

If the writing-operation-in-progress signal is not detected, the electronic information board does not receive an input, which means that the electronic information board displays characters and figures written on the display face based on contacting position information of the pen-like input device contacting the display face and an operation signal (writing-operation-in-progress signal) output from the pen-like input device. Therefore, to conduct writing to the electronic information board, the pen-like input device needs to transmit a signal that the pen end is contacted (pressed) to the display face to the electronic information board by wireless communication using infrared ray or the like. Further, because the pen-like input device is operated while being held by a hand, a wireless signal using infrared ray needs to be output all round directions of the pen-like input device.

Conventionally, a pen input device 400 having a light emitting unit shown in FIG. 11 is used. FIG. 11A is a schematic cross-sectional view of the pen input device 400, and FIG. 11B is a cross-sectional view of FIG. 11A cut at A-A line or B-B line. The pen input device 400 conducts wireless communication such as infrared ray communication to transmit a writing-operation-in-progress signal indicating that the pen input device 400 is touching a touch panel, and an erasing-operation-in-progress signal indicating that the pen input device 400 is conducting an erasing. The pen input device 400 needs to radiate infrared ray to 360 degrees about the pen axis to secure wireless communication (e.g., infrared ray communication) with the electronic information board for operations under any kind of situations.

Further, the pen input device 400 has a two ends such as a front end and a rear end. When writing and erasing operations are conducted, a user holds the pen input device 400 upside-down. Therefore, a light emitting unit (i.e., light source) for infrared ray communication needs to be disposed at the front end and the rear end. Therefore, as shown in FIG. 11, a light emitting diode (LED) is disposed at each of a top face, a back face, and two side faces of a board disposed in a body for both of the front end, the rear end, which means eight LEDs 401 are installed to conduct infrared ray radiation 402 to all directions. Therefore, greater power consumption is required for emitting light from the LEDs 401, with which battery life of the pen input device 400 becomes significantly short.

SUMMARY

In one aspect of the present invention, an input device for inputting coordinates to a coordinate detector is devised. The input device includes an operation detector to detect whether a coordinate input operation to the coordinate detector is conducted; a signal generation unit to generate an operation-in-progress signal indicating an operation is in progress when the operation detector detects the coordinate input operation; a signal outputting unit to output the operation-in-progress signal generated by the signal generation unit; and a light guide member to guide the operation-in-progress signal output by the signal outputting unit to an exit position.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 10(a), 10 (b) and 10 (c) show a positional relationship of the light emitting unit and the light guide member of the input device according to an example embodiment, and a relationship between positional relationship and light intensity; and FIGS. 11A and 11B are schematic views a light emitting unit of conventional input device.

Figure 1:
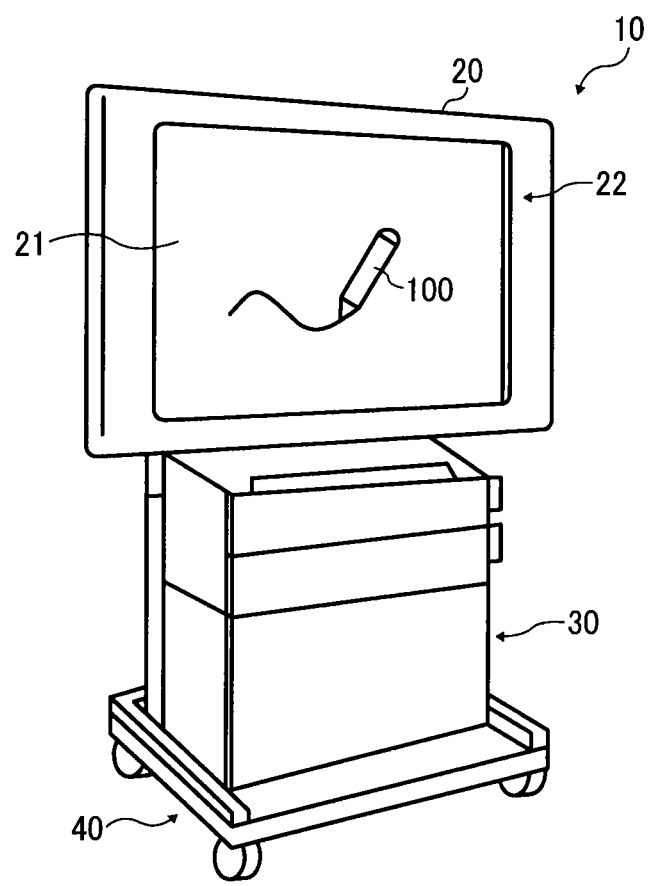
FIG. 1 is a perspective view of an electronic information board system employing an input device according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

(Configuration of Electronic Information Board System)

FIG. 1 is a schematic perspective view of an electronic information board system 10 employing an input device according to an example embodiment. The input device may have a pen-like shape, but not limited hereto.

The electronic information board system 10 includes, for example, a display unit 20 such as a display, a control box 30, and a stand 40. The display unit 20 can display electronic information such as images. The control box 30 encases a controller 60. The stand 40 supports the control box 30. To be described later, the controller 60 is used as a control unit to control the display unit 20 to display electronic information, and to control information input using an input device. Further, the electronic information board system according to an example embodiment is not limited to a configuration shown in FIG. 1. For example, the controller 60 can be encased in a casing of the display unit 20, or the controller 60 can be disposed back of the display unit 20, with which the control box 30 can be omitted. Further, when the electronic information board system is disposed on a wall of a meeting room, the stand 40 can be omitted.

In the configuration shown in FIG. 1, the control box 30 can encase various devices such as a printer and a video disk in addition to the controller 60. Further, a keyboard for inputting can be disposed on an upper side of the control box 30.

The display unit 20 is, for example, a flat panel such as liquid crystal panel or plasma panel. The display unit 20 is configured with a display face 21 (display device 21) and a touch panel 22 (coordinate detector) disposed at a front side of the display unit 20. The display face 21 (display device 21) is used to display images. The touch panel 22 (used as coordinate detector) detects coordinate position of the input device when the input device contacts the display face 21. Further, as to the display unit 20, the display face 21 (e.g., liquid crystal panel) and the touch panel 22 can be integrated as one unit, in which an input device 100 may be assumed contacting the display device 21.

As to the electronic information board system 10 of FIG. 1, text, characters and figures can be written on the display device 21 by contacting a writing unit disposed at one end of the input device 100 to the touch panel 22. To be described later in detail, when a front-end (i.e., writing end) of the input device 100 is contacted or pressed against the touch panel 22, the input device 100 outputs a writing-operation-in-progress signal indicating that a writing operation in progress as wireless signals (e.g., light signal such as infrared ray).

As to the electronic information board system 10, when a signal receiving unit receives the output writing-operation-in-progress signal, the controller 60 controls the display unit 20 to display characters and figures written at coordinate positions contacted by the input device 100 and then detected by the touch panel 22 on the display device 21.

As to the input device 100, when the rear-end of the input device 100, which is another end (i.e., erasing end), is contacted or pressed against the display device 21 (touch panel 22), the input device 100 outputs an erasing-operation-in-progress signal indicating that an erasing operation is in progress as wireless signals. When the display unit 20 receives the erasing-operation-in-progress signal output from the input device 100, the controller 60 controls the display unit 20 to erase characters and/or figures written at coordinate positions detected by the touch panel 22. When the erasing operation is conducted, the controller 60 conducts display processing that sets a color of detected coordinate positions with the same color of a background color (e.g., white).

(Electronic Information Board System)

Figure 2:
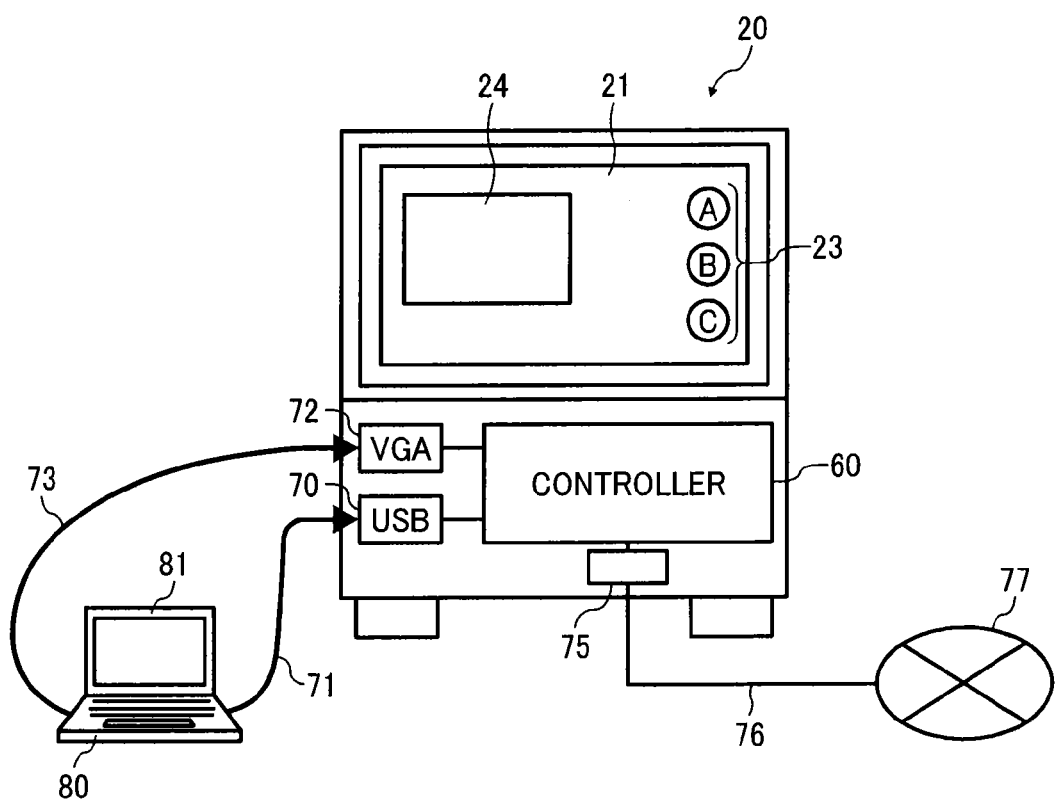
FIG. 2 is a schematic view of the electronic information board system of FIG. 1.
Figure 3:
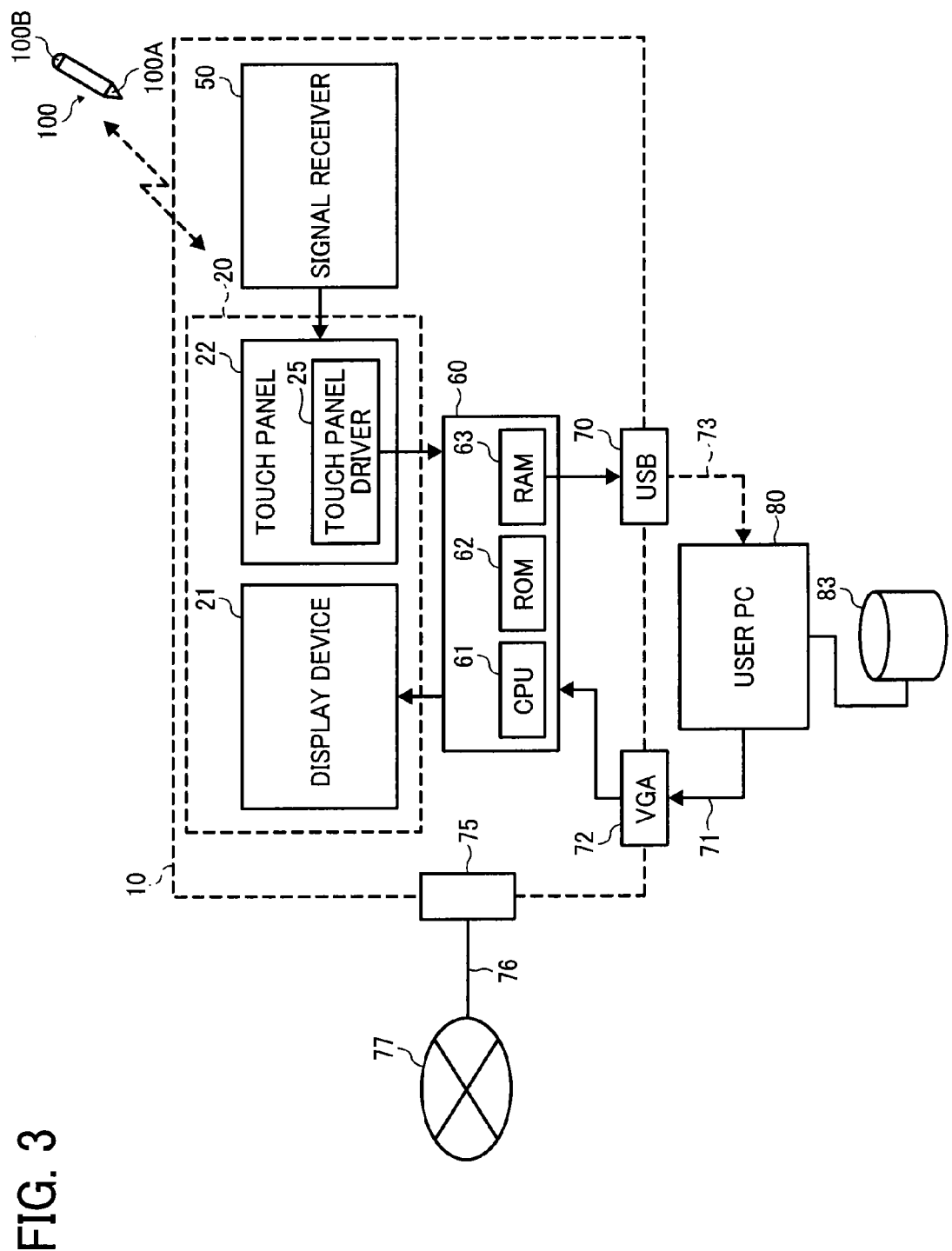
FIG. 3 is a block diagram of control system of the electronic information board system of FIG. 1.

FIG. 2 is a schematic view of a main section of the electronic information board system 10 shown in FIG. 1. FIG. 3 is a block diagram of control system of the electronic information board system 10 of FIG. 1. Hereinafter, a description is given of functional features of the electronic information board system 10.

As indicated in FIGS. 2 and 3, the electronic information board system 10 according to an example embodiment includes, for example, the display unit 20, a signal receiver 50 and the controller 60. The display unit 20 includes the display device 21 that displays information such as image information, and a touch panel 22. The touch panel 22 used as the coordinate detector receives an operational input by the input device 100, and detects coordinates corresponding to the operational input by the input device 100.

The controller 60 is a control unit that conducts various types of control such as displaying electronic information on the display unit 20 (display device 21), inputting information using the input device 100, and so on.

The signal receiver 50 can be disposed at one or more positions of the display unit 20, and receives an operation-in-progress signal such as a writing-operation-in-progress signal or an erasing-operation-in-progress signal output from the input device 100 as a wireless signal which is output as a light signal using infrared ray.

The controller 60, used as a control unit or system, includes, for example, a central processing unit (CPU) 61, a read only memory (ROM) 62, and a random access memory (RAM) 63. The CPU 61 conducts control to devise functions of the electronic information board system 10. The ROM 62 stores various control programs executable by the CPU 61. The RAM 63 can be used as a working memory that temporarily store various control programs and data used for execution by the CPU 61.

Further, the controller 60 conducts a control of display of an image on the display device 21 when an image is input by an operational input via a screen operation unit 23 and/or a user personal computer (PC) 80. Upon receiving an operation-in-progress signal output from the input device 100, the signal receiver 50 inputs the operation-in-progress signal to the touch panel 22. With this configuration, a touch panel driver 25 used as a control circuit of the touch panel 22 detects (or recognizes) that an operational input by the input device 100 is conducted based on the operation-in-progress signals output from the input device 100, and outputs an operation detection signal to the controller 60.

Further, the controller 60 may include a universal serial bus (USB) port 70 and a video graphics array (VGA) input port 72 used for connecting external connection terminals. The USB port 70 can connect a USB cable 71, and the VGA input port 72 can connect a VGA cable 73. The user PC 80 can be connected to the electronic information board system 10 via the USB port 70 and VGA input port 72. Further, the controller 60 may include a network interface (I/F) 75 to connect the electronic information board system 10 to a network 77 by connecting the Ethernet (registered trademark) cable 76 to the I/F 75.

The user PC 80 includes a monitor 81 and a storage 83. The monitor 81 is used to display an image. The storage 83 is, for example, a magnetic disk or the like that stores programs such as various contents and contents-display applications or the like. When desired content is selected from the contents stored in the storage 83 by a user operation, the monitor 81 displays the concerned content. When image data displayed on the monitor 81 of the user PC 80 is transmitted from the user PC 80 via the USB port 70 and VGA input port 72, the controller 60 displays the same image displayed on the monitor 81 on a user-PC-image display area 24 of the display device 21.

(Control System of Electronic Information Board System)

Figure 4:
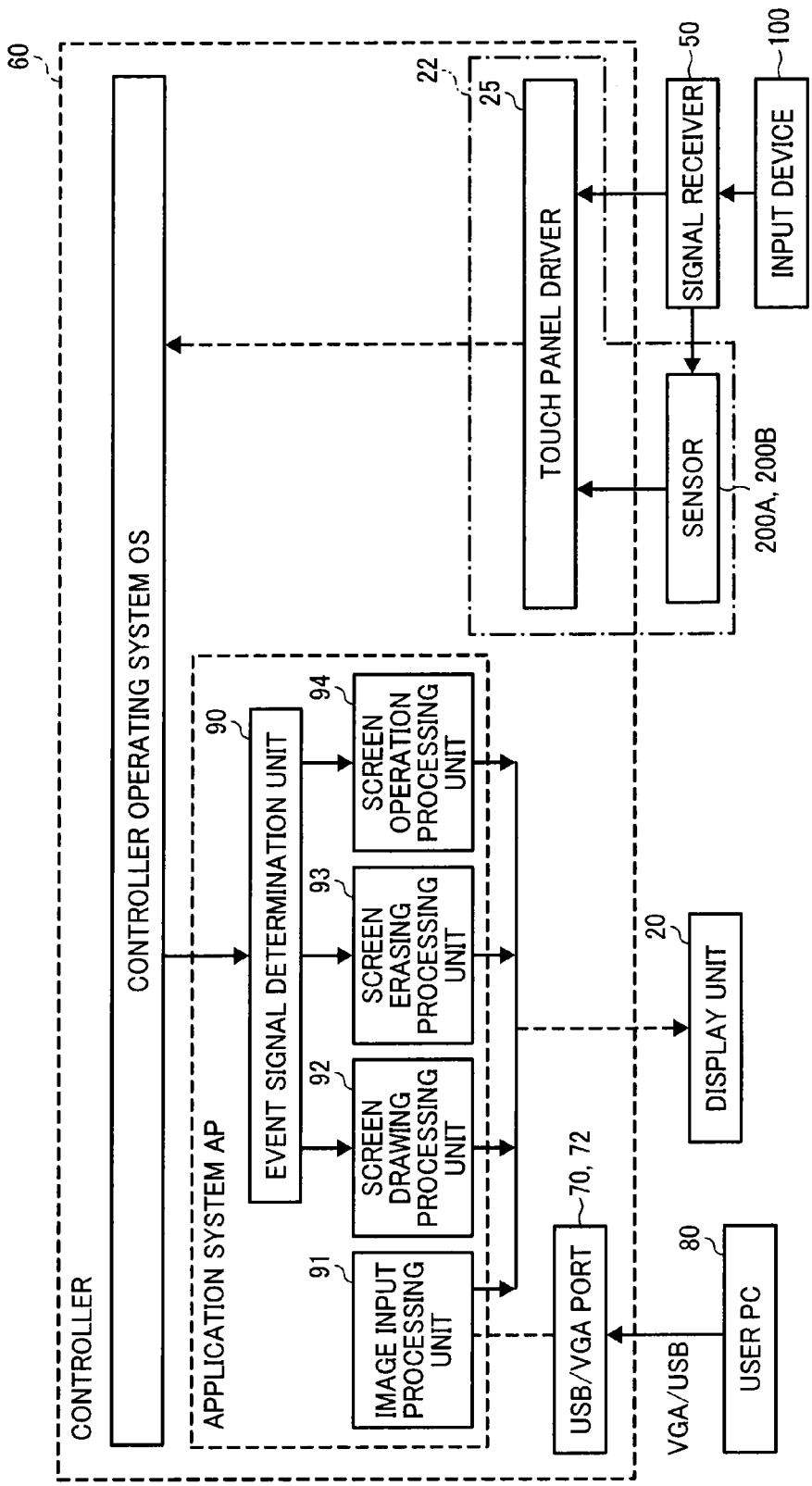
FIG. 4 is a functional block diagram of a controller of an electronic information board according to an example embodiment.

FIG. 4 is a block diagram of the controller 60 of the electronic information board system 10. As shown in FIG. 4, the controller 60 includes, for example, a controller operating system OS and an application system AP. The controller operating system OS is devised by executing control programs by the CPU 61. Further, the application system AP includes an event signal determination unit 90, an image input processing unit 91, a screen drawing processing unit 92, a screen erasing processing unit 93, and a screen operation processing unit 94.

The controller operating system OS is a main control that manages and executes control processing conducted by the controller 60 (CPU 61).

The application system AP conducts various control processing such as control of generating an entire image displayed on the display device 21 of the display unit 20, control of displaying on the user-PC-image display area 24, and control of displaying figures and characters when a writing detection signal by the input device 100 is detected.

A description is given of each unit in the application system AP. The event signal determination unit 90 monitors event signals input from the controller operating system OS, and conducts control process depending on input event signal.

The image input processing unit 91 conducts control process for displaying an image, input from the user PC 80 via an image input device (VGA port 72, USB port 70), on the user-PC-image display area 24 of the display device 21 of the display unit 20.

The screen drawing processing unit 92 generates handwriting graphic based on coordinate positioning formation of the input device 100 on the touch panel 22 input via the event signal determination unit 90, and displays the graphic on the display device 21.

When an image is already displayed on the display device 21, the screen drawing processing unit 92 superimposes the handwriting graphic on the image and displays the handwriting graphic on the display device 21.

Based on coordinate position information on the touch panel 22, input via the event signal determination unit 90, the screen erasing processing unit 93 generates graphic with a background color of an image displayed currently, and superimposes the generated background color graphic on the image already displayed on the display device 21, and then displays the background color graphic on the display device 21. With this control, the background color graphic is superimposed on the handwriting graphic displayed on the display device 21, with which the handwriting graphic can be erased in appearance.

The screen operation processing unit 94 converts coordinate position information (signal) input from the touch panel 22 to a pointing device signal such as a mouse event, and conducts processing based on ON/OFF operation of the screen operation unit 23 displayed on the display device 21.

Each of the first sensor 200A and the second sensor 200B has a configuration to emit light and to receive reflection light reflected from an object. Therefore, each of the first sensor 200A and the second sensor 200B can be used as a light-emitting/receiving sensor. Further, information of contacting position coordinates of the input device 100 detected by first sensor 200A and the second sensor 200B of the touch panel 22 is transmitted to the controller operating system OS with a coordinate value as a mouse-down event. Further, when the input device 100 is moved while being contacted on the display device 21 of the touch panel 22, information of contacting position coordinates of the input device 100 is transmitted to the controller operating system OS with a coordinate value as a mouse-up event.

The touch panel driver 25 converts a coordinate position signal, a writing detection signal or an erasing detection signal, input from the input device 100 and the touch panel 22, to a given event signal, and transmits the event signal to the controller operating system OS. Further, upon receiving a writing detection signal or an erasing detection signal from the input device 100 by the signal receiver 50, the touch panel driver 25 transmits the writing detection signal or the erasing detection signal to the controller operating system OS with a coordinate position signal.

(Configuration of Input Device)

Figure 5:
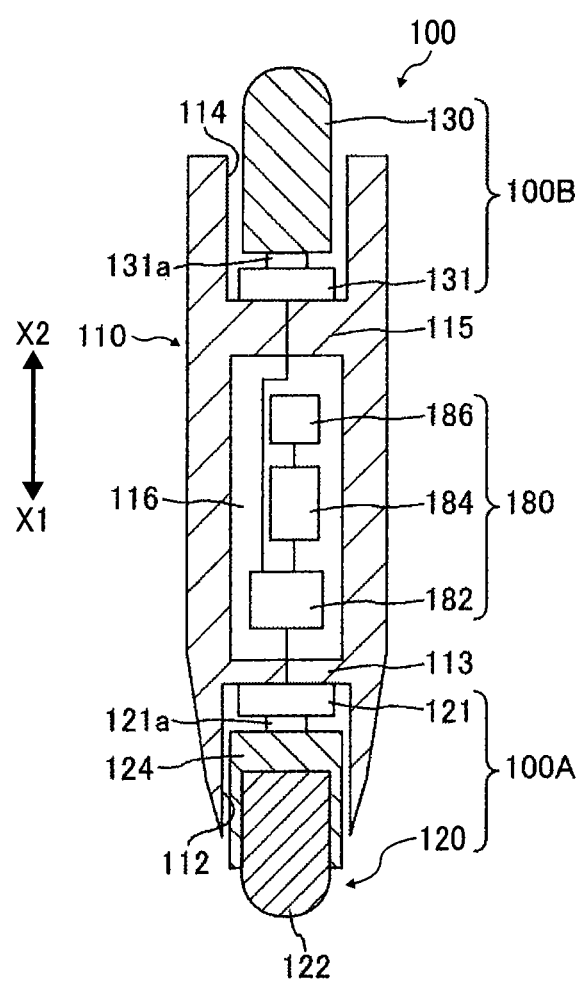
FIG. 5 is a cross-sectional view of an input device according to an example embodiment.

A description is given of a configuration of the input device 100. FIG. 5 shows a cross-sectional view of the input device 100 according to an example embodiment. As shown in FIG. 5, the input device 100 includes, for example, a casing 110 having cylinder shape, a writing unit 100A, and an erasing unit 100B. The writing unit 100A disposed at one end of the casing 110 is used for a writing operation to the touch panel 22. The erasing unit 100B disposed at another end of the casing 110 is used for an erasing operation to the touch panel 22.

The writing unit 100A includes a front end moveable unit 120 (first moveable unit) and a front-end detection switch 121 inside a front-end concave portion 112 disposed at a front end of the casing 110 (i.e., writing operation side). The front-end detection switch 121 is used as an operation detector that detects whether an operation is conduced or not. Further, in a configuration of FIG. 5, the front-end moveable unit 120 includes a front-end member 122, and a front-end retaining member 124 that retains the front-end member 122.

Further, the erasing unit 100B includes a rear-end moveable unit 130 (second moveable unit) and a rear-end detection switch 131 inside a rear-end concave portion 114 disposed at a rear end of the casing 110 (i.e., erasing operation side). The rear-end detection switch 131 is used as an operation detector that detects whether an operation is conduced or not.

One end of the front-end detection switch 121 is fixed on a wall 113 formed at a bottom of the front-end concave portion 112. One end of the rear-end detection switch 131 is fixed on a wall 115 formed at a bottom of in the rear-end concave portion 114.

The front-end detection switch 121 and the rear-end detection switch 131 are, for example, push switches. The front-end detection switch 121 includes a front-end moveable member 121a protruded along the axis direction of the casing 110. The rear-end detection switch 131 includes a rear-end moveable member 131a protruded along the axis direction of the casing 110. The front-end moveable member 121 a is spaced apart from the front-end moveable unit 120 with a tiny clearance. The rear-end moveable member 131a is spaced apart from the rear-end moveable unit 130 with a tiny clearance.

Further, the front-end detection switch 121 includes a spring to press front-end moveable member 121 aprotruded from an end to an off-position. Further, the rear-end detection switch 131 includes a spring to press the rear-end moveable member 131 a protruded from an end to an off-position When the front-end moveable unit 120 is moved for a given distance or more along the axis direction of the casing 110 (i.e., when the front-end moveable unit 120 is pressed against the touch panel 22 and pushed into the inside along the axis direction), the front-end moveable member 121 a is pressed.

When the rear-end moveable unit 130 is moved for a given distance (the above mentioned tiny clearance) or more along the axis direction of the casing 110 (i.e., when the rear-end moveable unit 130 is pressed against the touch panel 22 and pushed into inside along the axis direction), the rear-end moveable member 131 a is pressed.

When the front-end moveable unit 120 is moved for a given distance (the above mentioned tiny clearance) or more along the axis direction, wherein the given distance corresponds to a movable-distance range that changes the front-end detection switch 121 from OFF to ON, an operation-in-progress signal such as a writing-operation-in-progress signal is output. Further, when the rear-end moveable unit 130 is moved for a given distance or more along the axis direction, wherein the given distance corresponds to a movable-distance range that changes the rear-end detection switch 131 from OFF to ON, an operation-in-progress signal such as an erasing-operation-in-progress signal is output.

Further, the input device 100 includes an output circuit unit 180 in an internal space 116 of the casing 110. The output circuit unit 180 includes a signal input unit 182, a signal processing unit 184, and a signal outputting unit 186.

The signal input unit 182 is input with an operation-in-progress signal such as a writing-operation-in-progress signal from the front-end detection switch 121, or is input with an operation-in-progress signal such as an erasing-operation-in-progress signal from the rear-end detection switch 131.

The signal processing unit 184 (useable as a signal generation unit) converts an operation-in-progress signal input via the signal input unit 182 to a wireless signal.

The signal outputting unit 186 (useable as a signal outputting unit) outputs the wireless signal such as infrared ray generated at the signal processing unit 184. It should be noted that the wireless signals is not limited infrared ray, but other signals such as radio wave, light, sound wave can be used.

(Operation Method of Input Device)

Figure 6:
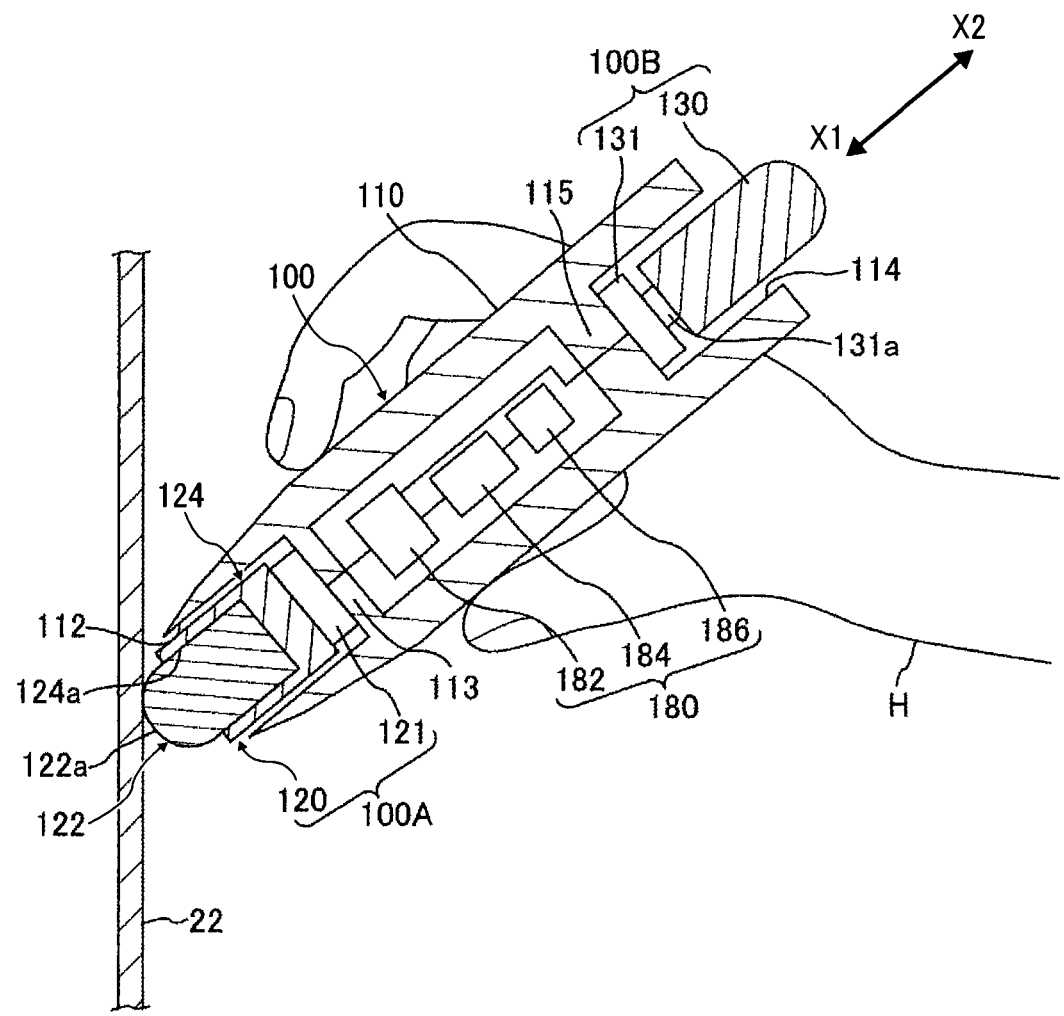
FIG. 6 is a schematic view of the input device when a writing operation or an erasing operation is conducted.

FIG. 6 is a schematic view of an operation method of writing or erasing by the input device 100. As shown in FIG. 6, a user such as an operator holds the casing 110 with a hand H when operating the input device 100. For example, the hand H holds a middle of the casing 110 in the axis direction.

As shown in FIG. 6, a front edge portion 122a of the front-end member 122 of the front-end moveable unit 120 of the input device 100 is contacted to the touch panel 22 (display device 21) of the display unit 20, and the casing 110 is pressed against the display device 21 (touch panel 22). With this configuration, the front-end moveable unit 120 slides in the X2 direction in the concave portion 112 of the casing 110, and a press member 124a of the front-end retaining member 124 presses the moveable member 121 a to set ON position of the front-end detection switch 121. With this configuration, the front-end detection switch 121 is set ON, and a writing-operation-in-progress signal can be transmitted. The writing-operation-in-progress signal can be converted to a wireless signal by the output circuit unit 180 and output.

When the input device 100 is moved while maintaining the front-end detection switch 121 at ON, contacting position of the front-end moveable unit 120 is moved, and under a control of the controller 60, handwriting characters and/or figures can be displayed on the display device 21. In this case, the front edge portion 122a of the front-end member 122 protruded from a front-end of the casing 110 of the input device 100 slides on the display device 21 while elastically deforming its shape with an effect of contact pressure.

Further, opposite to a case shown in FIG. 6, when an erasing operation is conducted, the rear-end moveable unit 130 is used instead of the front-end moveable unit 120, in which the rear-end moveable unit 130 is contacted to the touch panel 22, and the casing 110 is pressed against the touch panel 22 (display device 21). With this configuration, the rear-end detection switch 131 is set ON, and an erasing-operation-in-progress signal is transmitted. The erasing detection signal is converted to wireless signal by the output circuit unit 180 and output.

(Coordinate Detection Method of Input Device)

Figure 7:
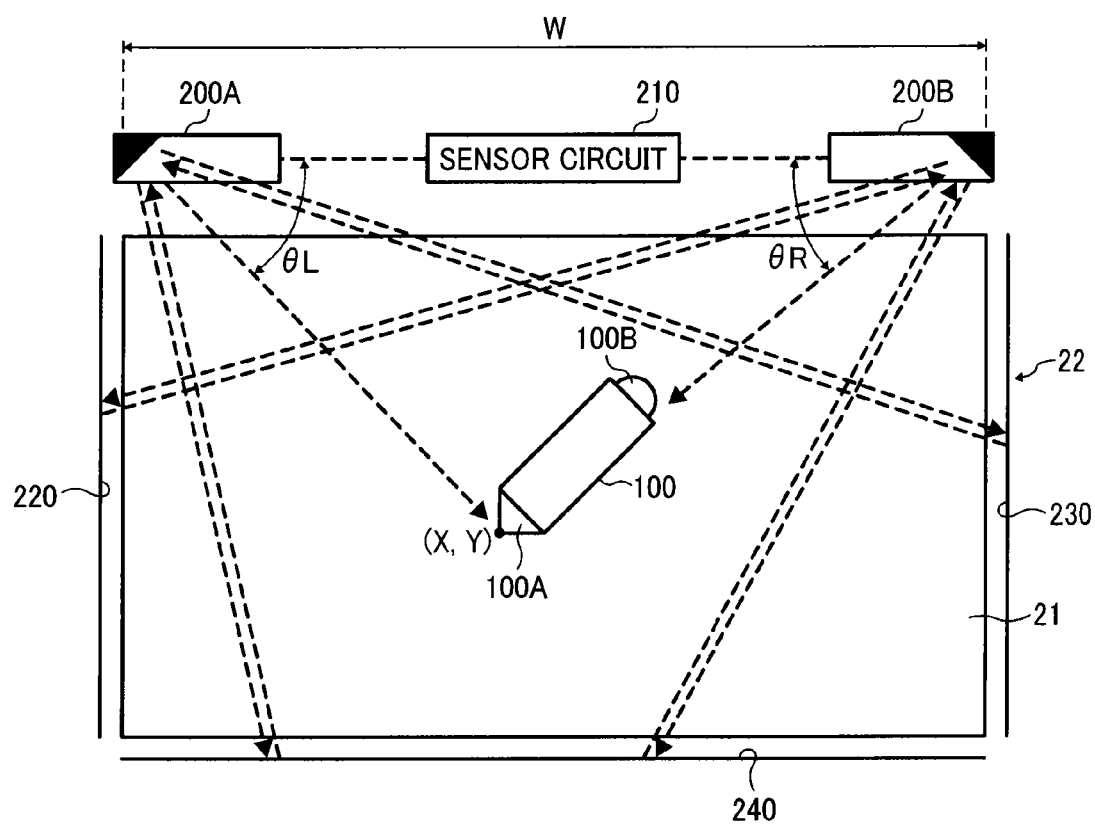
FIG. 7 is a schematic view when a touch panel detects coordinate position of the input device.

FIG. 7 is a schematic view of the touch panel 220 for detecting coordinate position of the input device 100. With reference to FIG. 7, a method of detecting coordinates of the input device 100 on the electronic information board system 10 according to an example embodiment is described. As shown in FIG. 7, the touch panel 22 includes a pair of sensors such as the first sensor 200A and the second sensor 200B disposed above at each top corner of the display device 21. For example, the first sensor 200A is disposed above the top-left corner of the display device 21, and the second sensor 200B is disposed above the top-right corner of the display device 21. Further, the touch panel 22 includes a sensor circuit 210. When detection results of the first sensor 200A and the second sensor 200B are input, the sensor circuit 210 computes coordinates of contact position of the input device 100.

Further, the touch panel 22 includes reflection plates 220, 230, and 240 respectively disposed at left, right and bottom sides of the display device 21 as shown in FIG. 7.

The first sensor 200A disposed above the top-left corner radiates infrared ray (i.e., probe light) along a plane parallel to the display device 21, and a radiation direction of infrared ray is directed to a substantially entire area of the reflection plate 230 at the right side and the reflection plate 240 at the bottom side.

Further, the second sensor 200B disposed above the top-right corner radiates infrared ray (i.e., probe light) along a plane parallel to the display device 21, and a radiation direction of infrared ray is directed to a substantially entire area of the reflection plate 220 at the left side and the reflection plate 240 at the bottom side. When nothing touches the touch panel 22 (display device 21), the infrared ray radiated from the first sensor 200A and the second sensor 200B is reflected at the reflection plates 220, 230, 240, and the reflection light is received by the first sensor 200A and the second sensor 200B.

By contrast, when the front-end moveable unit 120 or the rear-end moveable unit 130 contacts the touch panel 22 (display device 21) of the input device 100, the infrared ray radiated from the first sensor 200A and the second sensor 200B is blocked by the input device 100 contacting the touch panel 22. Therefore, the sensor circuit 210 detects an angle from the horizontal direction at a position where the infrared ray is blocked based on detection signals from the first sensor 200A and the second sensor 200B, and computes coordinate position using a formula of the fundamental of triangulation, and then converts the coordinate position to X-Y coordinates.

A description is given of computing of coordinates (X, Y) of a position where the input device 100 contacts using the sensor circuit 210. When the probe light of the first sensor 200A is blocked by the input device 100 as shown in FIG. 7, an exit/incident angle θnL of the probe light of the first sensor 200A blocked by the input device 100 (θnR for the second sensor 200B) can be computed by using the following formula.

$$\theta nL = \arctan(DnL/f) \quad (1)$$

$$\theta nR = \arctan(DnR/f) \quad (2)$$

DnL is a scotoma position on a light receiving element of the first sensor 200A detected by a peak detector. DnR is a scotoma position on a light receiving element of the second sensor 200B detected by a peak detector. "1" is a distance between the light receiving element and a cylindrical lens or a condensing lens disposed for each of the first sensor 200A and the second sensor 200B, and corresponds to a focal distance of lens.

Further, by using θnL obtained by using the above formula (1), an angle θL defined by the input device 100 and the first sensor 200A can be computed by using the following formula.

$$\theta L = g(\theta nL) \quad (3)$$

In formula (3), g is a conversion coefficient of geometrical relative positional relationship between the input device 100 and the first sensor 200A.

Further, by using θnR obtained by using the above the formula (2), an angle θR defined by the input device 100 and the second sensor 200B can be computed by using the following formula.

$$\theta R = h(\theta nR) \quad (4)$$

In formula (4), h is a conversion coefficient of geometrical relative positional relationship between the input device 100 and the second sensor 200B.

Further, positional coordinates (X, Y) of the input device 100 can be computed by using the following formula based on the fundamental of triangulation.

$$X = W \tan \theta R / (\tan \theta L + \tan \theta R) \quad (5)$$

$$Y = W \tan \theta L \cdot \tan \theta R / (\tan \theta L + \tan \theta R) \quad (6)$$

In formulas (5) and (6), W is a distance between the first sensor 200A and the second sensor 200B.

Based on the above formulas (1) to (6), positional coordinates (X, Y) of the input device 100 can be computed as functions of DnL and DnR. Specifically, when a scotoma position DnL on the light receiving element of the first sensor 200A and a scotoma position DnR on the light receiving element of the second sensor 200B are detected, positional coordinates (X, Y) of contacting position of the input device 100 can be detected.

Coordinate position signals obtained by the sensor circuit 210 are input to the controller 60 via the touch panel driver 25. Then, upon receiving the process by the controller operating system OS, the coordinate position signals are transferred to the screen drawing processing unit 92, the screen erasing processing unit 93, and the screen operation processing unit 94.

In the above touch panel, infrared ray is used, but not limited to the infrared ray. For example, a matrix switch method, a resistive film method, a surface acoustic wave method, an electromagnetic induction method, and an electrostatic capacity method can be selectively used.

(Light Emitting Unit of Input Device)

Figure 8A:
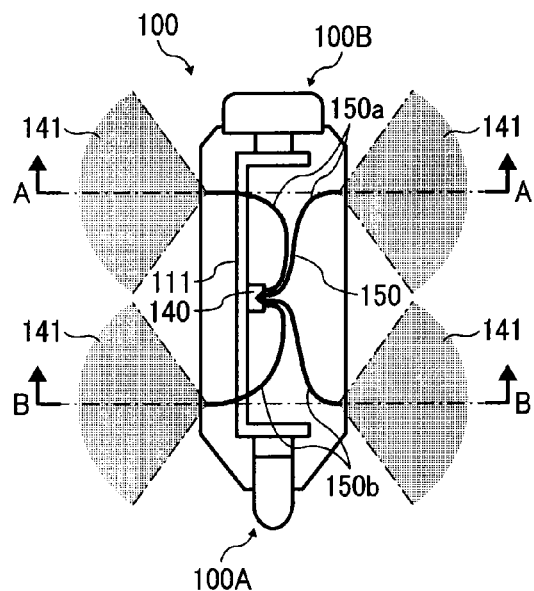
FIGS. 8A and 8B are schematic views of a light emitting unit of the input device according to an example embodiment.
Figure 8B:
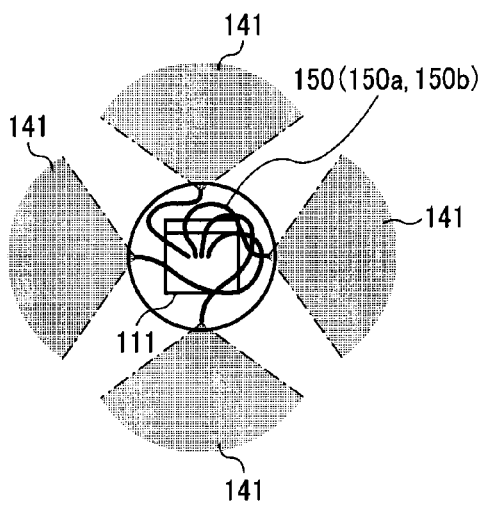

FIG. 8 is a schematic view of a light emitting unit of the input device 100. FIG. 8A is a cross-sectional view of the input device 100, and FIG. 8B is a cross-sectional view cut at A-A line and B-B line in FIG. 8A. As shown in FIG. 8A, the input device 100 includes a board 111 inside the input device 100, and the board 111 is disposed with, for example, one light emitting diode (LED) 140. The LED 140 corresponds to the signal outputting unit 186 shown in FIGS. 5 and 6.

Further, the input device 100 includes an optical fiber 150 used as a light guide member. For example, the optical fiber 150 includes a plurality of cables to guide (or transmit) infrared ray emitted by the LED 140 to a portion where light is emitted or exit from the input device 100. Further, the optical fiber 150 includes an optical fiber 150a and an optical fiber 150b. The optical fiber 150a is used to radiate infrared ray emitted by the LED 140 to 360-degree direction of the front-end side, and the optical fiber 150b is used to radiate infrared ray emitted by the LED 140 to 360-degree direction of the rear-end side.

As shown in FIG. 8B, the infrared ray emitted by the LED140 is guided by the optical fiber 150 having a plurality of cables (eight cables in FIG. 8), and then the infrared ray is radiated to the 360-degree direction of the front-end side (B-B cross-sectional view) and to the 360-degree direction of the rear-end side (A-A cross-sectional view) as radiation light 141.

If the optical fiber is bent more than an allowable curvature radius, the light may leak from the bent portion, with which light guide efficiency may deteriorate. To prevent the light leak, as shown in FIG. 8B, the optical fiber 150 is installed spirally in the input device 100 to set the curvature as small as possible. By guiding the infrared ray using the optical fiber 150, the light emitted from one single LED can be guided to a given portion and is then radiated, with which the infrared ray can be radiated to substantially all round directions of the front-end and the rear-end sides. With this configuration, even if an operator holds and operates the input device 100 with any posture, the writing-operation-in-progress signal and the erasing-operation-in-progress signal can be effectively transmitted for the electronic information board system 10. Further, because the light communication can be conducted using one single LED, power consumption can be reduced, with which battery life of the input device 100 can be extended.

(End of Light Guide Member)

Figure 9A:
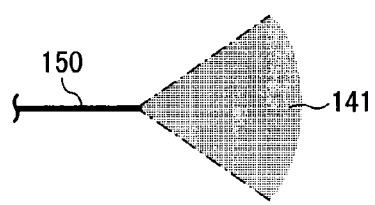
FIGS. 9A and 9B are schematic views of an end of a light guide member of the input device according to an example embodiment.
Figure 9B:
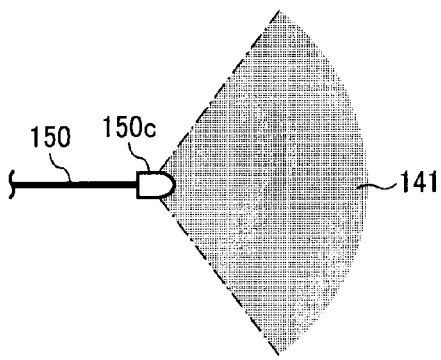

FIG. 9 is a schematic view of an end of the light guide member of the input device 100 according to an example embodiment. The light radiation from an output end (i.e., radiation end) of the optical fiber 150, which guides the light emitted by the LED, may have a radiation range as shown in FIG. 9A, which is not a broader area. In this case, as shown in FIG. 9B, a light diffusion member 150c, used as a diffusion member, can be disposed at the output end of the optical fiber 150, with which the light can be radiated with diffused manner to a broader area. The light diffusion member 150c is, for example, a concave lens, a SELFOC (registered trademark) lens or the like.

(Light Emitting Unit and Light Guide Member)

Further, light intensity of light emitted by the LED may decrease sharply depending on an angle from the vertical direction. Therefore, when light quantity required for the light communication may not be secured depending on angle positions of the input device 100, and distance, writing and erasing operation by the input device 100 may not be conducted.

Figure 10:
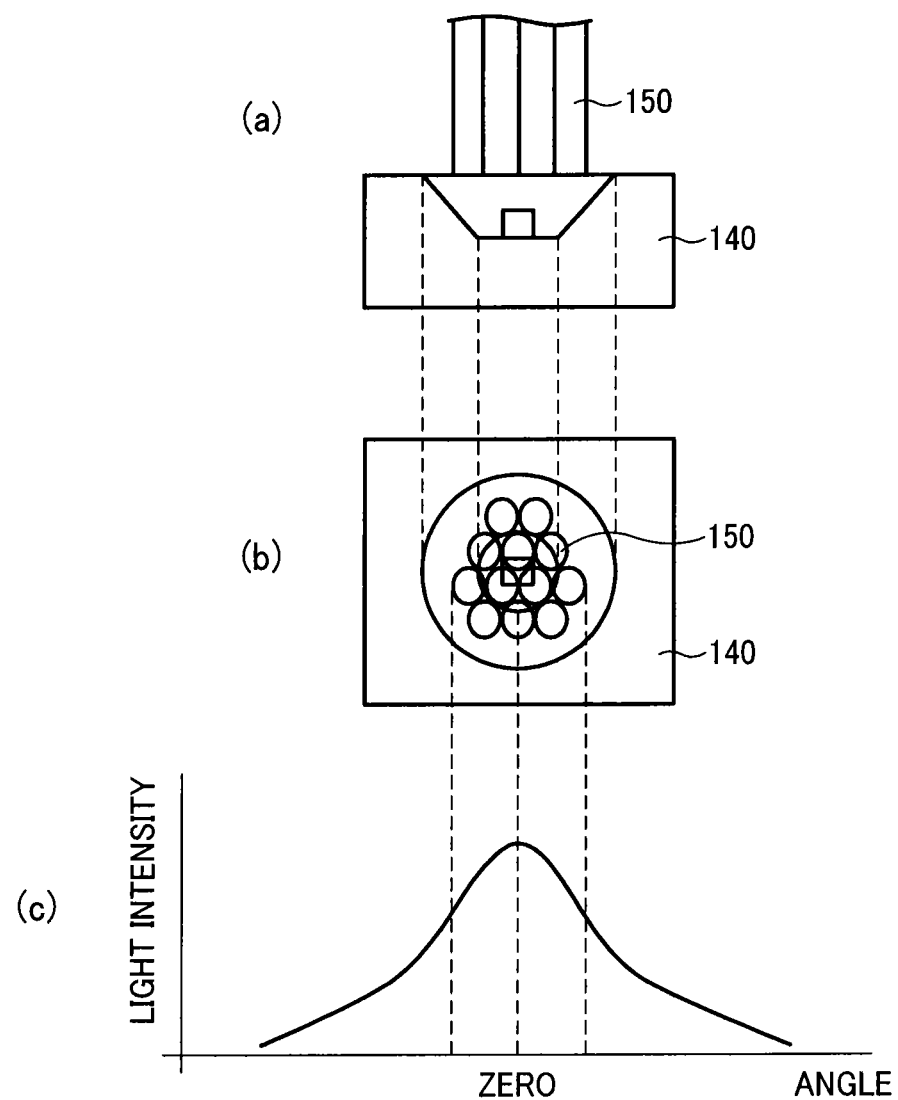

FIG. 10 shows a positional relationship of the light emitting unit and the light guide member of the input device 100 according to an example embodiment, and a relationship between the positional relationship and light intensity.

FIG. 10(a) shows a relationship between the light emitting unit (LED140) and the light guide member (optical fiber 150) along the light radiation direction. FIG. 10(b) shows a relationship between the light emitting unit (LED140) and the light guide member (optical fiber 150) in a plan view. FIG. 10(c) shows a relationship between light emitting angle at the light emitting unit and light intensity.

As shown in FIG. 10(c), the light emitting unit such as LED140 can emit light to a broader angle range (light radiation). However, the greater an angle with respect to the vertical direction (i.e., optical axis direction) of a light emitting face, the greater the decrease of the light intensity. Therefore, light intensity becomes weak at an area where an angle with respect to the vertical direction (i.e., optical axis direction) of the light emitting unit is great, in which reliable communication may not be established such as operation-in-progress signals cannot be reported to the controller of the electronic information board system 10.

In light of this issue, as shown in FIGS. 10(a) and 10(b), an opening of the light guide member (optical fiber 150) is faced to the light emitting unit (LED 140). With this configuration, light having a smaller angle with respect to the optical axis of the light emitting unit (i.e., light having greater light intensity) can be condensed. Then, the light is guided to a given position via the light guide member such as an optical fiber and radiated, with which communication can be conducted using only the light having the greater light intensity, and reliable communication can be established. With this configuration, signals having effectively enough light intensity can be output constantly, with which signals of the writing operation and erasing operation can be correctly reported to the controller of the electronic information board system 10.

In the above described example embodiment, an input device used for the electronic information board system 10 is described, but the present invention can be applied to other apparatuses such as a display apparatus having a touch panel, an input device of a terminal apparatus, a tablet using a pen or the like.

Further, in the above described example embodiment, a writing unit is disposed at one end of the input device, and an erasing unit is disposed at one end of the input device, but a configuration is not limited hereto. For example, instead of the erasing unit, a writing unit that can select a plurality of colors can be disposed. Further, the above described example embodiment can be applied to a configuration that light is emitted from a front-end of the input device, and the electronic information board system 10 can detect the light emitted from the front-end of the input device for detecting position of the front-end of the input device. Further, a shape of the input device for the electronic information board system 10 is not limited to a pen. Further, the above described example embodiment can be applied to various input devices that require to output an operation-in-progress signal for coordinate input devices used for various systems.

As to the above described example embodiment of the input device and the electronic information board system, operation signals can be output to broader directions while limiting the number of signal outputting units, with which power consumption of the signal outputting unit can be suppressed and battery life and life time of input device can be extended.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An input device for inputting coordinates to a coordinate detector, comprising:
    an operation detector to detect whether a coordinate input operation to the coordinate detector is conducted;
    a signal generation unit to generate an operation-in-progress signal indicating an operation is in progress when the operation detector detects the coordinate input operation and the operation-in-progress signal is a light signal;
    a signal outputting unit to output the operation-in-progress signal generated by the signal generation unit;

a light guide member to guide the operation-in-progress signal output by the signal outputting unit to an exit position, and the light guide member includes:
an input end and an output end opposite with each other,
a diffusion member provided to the output end so that light is diffused and emitted, and
an opening of the light guide member that faces the signal outputting unit;
a casing of cylindrical shape; and
a moveable unit disposed at least at one end of the casing, the moveable unit being moveable in an axis direction of the casing when the moveable unit contacts the coordinate detector,
wherein the signal generation unit generates the operation-in-progress signal corresponding to a movement of the moveable unit.

2. The input device of claim 1, wherein the moveable unit includes a first moveable unit disposed at one end of the casing for a writing input operation to the coordinate detector, and a second moveable unit disposed at another end of the casing for an erasing input operation to the coordinate detector,
wherein the signal generation unit generates an operation-in-progress signal indicating the writing input operation when the first moveable unit moves, and generates an operation-in-progress signal indicating the erasing input operation when the second moveable unit moves.

3. The input device of claim 1, wherein the light guide member is disposed spirally inside the casing.

4. An electronic information board system comprising:
the input device of claim 1;
a display unit to display graphic;
a coordinate detector to detect coordinate position of the input device on a display face of the display unit;
a signal receiving unit to receive a signal wave emitted from the light guide member disposed for the input device; and
a control unit to control a display of image, corresponding to an operation of the input device, to coordinate position on the display face detected by the coordinate detector when the signal wave is received by the signal receiving unit.

5. The input device of claim 1, wherein the opening of the light guide member is spaced apart from the signal outputting unit so that the opening receives light output at an angle with respect to an optical axis of the signal outputting unit that is smaller than a maximum angle of the light output with respect to the optical axis.

6. The input device of claim 1, wherein the light guide member includes a plurality of light guide members.

7. An input device for inputting coordinates to a coordinate detector, comprising:
a switch to detect whether a coordinate input operation to the coordinate detector is conducted;
circuitry configured to generate an operation-in-progress signal indicating an operation is in progress when the switch detects the coordinate input operation, and the operation-in-progress signal is a light signal;
a light emitting diode (LED) to output the operation-in-progress signal generated by the circuitry;
an optical fiber to guide the operation-in-progress signal output by the LED to an exit position, and the optical fiber includes:
an input end and an output end opposite with each other,
a lens provided to the output end so that light is diffused and emitted, and
an opening of the optical fiber that faces the LED;
a casing of cylindrical shape; and
a moveable structure disposed at least at one end of the casing, the moveable structure being moveable in an axis direction of the casing when the moveable structure contacts the coordinate detector,
wherein the circuitry is configured to generate the operation-in-progress signal corresponding to a movement of the moveable structure.

8. The input device of claim 7, wherein the opening of the optical fiber is spaced apart from the LED so that the opening receives light output at an angle with respect to an optical axis of the LED that is smaller than a maximum angle of the light output with respect to the optical axis.

9. The input device of claim 7, wherein the optical fiber includes a plurality of optical fibers.

* * * * *